(12) United States Patent
Hämäläinen et al.

(10) Patent No.: US 6,567,393 B2
(45) Date of Patent: May 20, 2003

(54) DYNAMIC RESELECTION OF CDMA SPREADING CODES

(75) Inventors: Seppo Hämäläinen, Espoo (FI); Jussi Vepsäläinen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 261 days.

(21) Appl. No.: 09/794,934

(22) Filed: Feb. 27, 2001

(65) Prior Publication Data

US 2003/0043774 A1 Mar. 6, 2003

(51) Int. Cl.[7] .......................... H04J 11/00; H04Q 7/00; H04Q 7/20; H04B 7/216
(52) U.S. Cl. .................. 370/342; 370/208; 370/328; 370/335; 455/422; 455/436
(58) Field of Search .................. 370/208, 335, 370/342, 441, 479, 328, 329, 331; 455/422, 436, 450, 442; 375/142, 149, 150, 140

(56) References Cited

U.S. PATENT DOCUMENTS

| 5,483,669 | A | * | 1/1996 | Barnett et al. | 455/437 |
|---|---|---|---|---|---|
| 5,701,586 | A | * | 12/1997 | Tabbane et al. | 455/422 |
| 5,903,839 | A | * | 5/1999 | Mattila | 455/434 |
| 5,930,710 | A | * | 7/1999 | Sawyer et al. | 455/436 |
| 6,188,682 | B1 | * | 2/2001 | Takagi et al. | 370/342 |
| 6,317,422 | B1 | * | 11/2001 | Khaleghi et al. | 370/342 |
| 6,349,208 | B1 | * | 2/2002 | Sexton et al. | 455/439 |
| 6,377,803 | B1 | * | 4/2002 | Ruohonen | 455/434 |
| 6,424,618 | B1 | * | 7/2002 | Uesugi et al. | 370/208 |

* cited by examiner

Primary Examiner—Huy D. Vu
Assistant Examiner—M. Phan
(74) Attorney, Agent, or Firm—Cohen, Pontani, Lieberman & Pavane

(57) ABSTRACT

A CDMA system transmits from a base station to a plurality of mobile stations or from mobile station to base station on a shared frequency band, each mobile station's data being spread by a different spreading code chosen from a set of orthogonal codes. Each receiver in base station or mobile station correlates for its intended data by despreading the signal using its particular one of the orthogonal codes. Under certain transmission delays, the effects of orthogonality may diminish and another mobile station's signal may cross-correlate with a mobile station's signal. If not all of the orthogonal codes are in use, the present invention determines another selection of orthogonal codes that yields lower cross-correlation under current delay conditions.

10 Claims, 1 Drawing Sheet

DYNAMIC RESELECTION OF CDMA SPREADING CODES

BACKGROUND OF THE INVENTION

1. Field of the Invention

The present invention relates to CDMA radio channels, and particularly to enhancing performance through dynamically reselecting spreading codes according to current conditions.

2. Description of the Related Art

Typically in wireless telephony, a plurality of base stations (BS) are deployed over the landscape, each of which communicates by radio with a plurality of mobile stations (MS) within its range. Code-division multiple access (CDMA) is a widely used radio transmission medium for wireless telephony. Each user's signal is spread by multiplying it by a combination of a long code common to all mobile stations communicating with a particular base station and a pseudo-noise (PN) code unique to each of those mobile stations. The users are thus co-occupying all of the available bandwidth. At the mobile station, each user's signal is recovered by correlating against a combination of the long code and the user's PN code. This operation is also called despreading. The spreading codes are chosen from a set of orthogonal codes, so that a signal intended for a mobile station will exhibit low cross-correlation with signals intended for other mobile stations. When correlating a particular mobile station's signal, all other mobile stations' signals are cancelled due to low cross-correlation.

The transmission delays of each multipath at each mobile station are determined by a searcher, and the signals are delayed accordingly for correlation. The searcher can determine delays for each multipath component, and a known rake receiver (see, for example, CDMA IS-95 for Cellular and PCS, Harte et al, McGraw Hill, New York, N.Y., 1999, ISBN No. 0-07-027070-8, pp. 64–66) can recover signal from several different multipath components by having a correlator for each multipath component, each operating on signal delayed by the appropriate amount. The outputs of the several correlators are then summed. The PN codes are chosen for orthogonality (i.e., low cross-correlation) in order to minimize the apparent noise presented by other mobile stations' signals when correlating for a particular mobile station.

The third-generation (3G) standard for CDMA calls for wideband CDMA (WCDMA), and includes time-division duplex (TDD). TDD-WCDMA simulations show that the limited auto-correlation and cross-correlation properties of relatively short orthogonal variable spreading factor (OVSF) codes have a significant effect on the channel performance. As transmission conditions change (mobile stations move to different positions, new mobile stations come on, or propagation conditions change) the combination of codes currently in use may become less effective. Although the OVSF codes are chosen for orthogonality, when signals spread by the various OVSF codes are delayed by significantly different amounts, on the order of multiple chip times, the effect of orthogonality diminishes. That is, while correlating for a particular code, another mobile station's signal exhibiting a significantly different delay may partially correlate, thus raising the noise floor above which the current signal must be detected. There is thus a need to determine optimum code combinations under current conditions when a new mobile station is to be initiated, or when performance for an existing mobile station falls below a predetermined threshold.

SUMMARY OF THE INVENTION

To overcome limitations in the prior art described above, the present invention dynamically reselects channel spreading codes according to current transmission delay and signal strength for each multipath component of each channel upon determination that a channel has degraded to an unacceptable error rate, or when a new connection between a base stations and a mobile station is initiated, or when a mobile station is handed off from one base station's coverage area to another.

Other objects and features of the present invention will become apparent from the following detailed description considered in conjunction with the accompanying drawing. It is to to be understood, however, that the drawing is designed solely for purposes of illustration and not as a definition of the limits of the invention, for which reference should be made to the appended claims. It should be further understood that the drawing is merely intended to conceptually illustrate the structures and procedures described herein.

DETAILED DESCRIPTION OF THE PRESENTLY PREFERRED EMBODIMENTS

Figure 1:
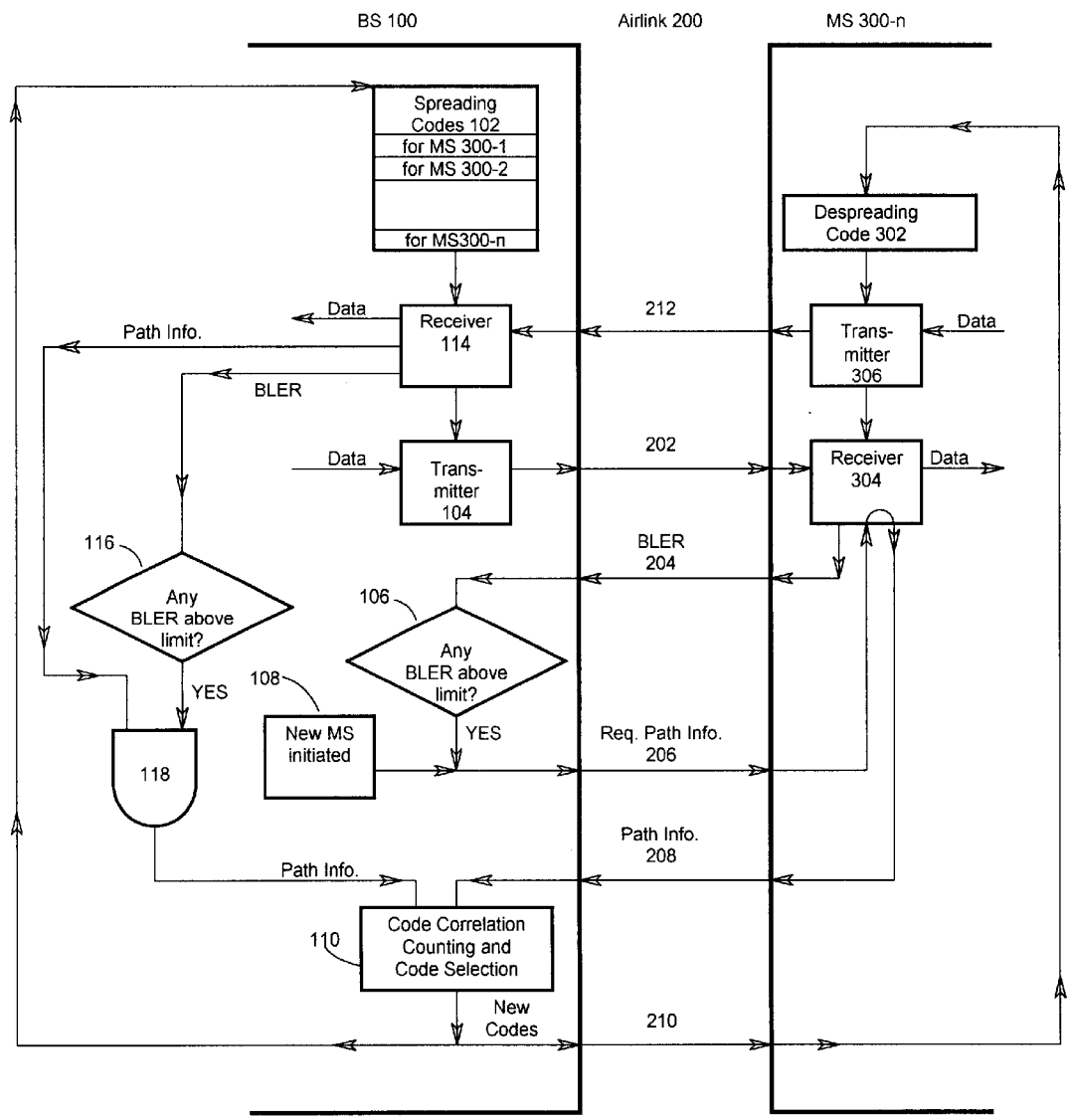
FIG. 1 is a block diagram of one embodiment of the invention in a CDMA system.

In the following description of the various embodiments, reference is made to the accompanying drawing which forms a part hereof, and in which is shown by way of illustration an embodiment in which the invention may be practiced. It is to be understood that other embodiments may be utilized and structural and functional modifications may be made without departing from the scope of the present invention.

In wireless telephony, a base station (BS) communicates by radio with a plurality of mobile stations (MS) within range of the BS. In the presently preferred embodiments, CDMA is the medium used for this radio communication. Although the invention is conceived in connection with so Time-Division Duplex (TDD) CDMA as contemplated for the Third-Generation Universal Mobile Telephone System (3G UMTS), the invention may be practiced in any CDMA system. For example, the methods described may be employed for code set selection in each time slot of a TDD CDMA system, or to adjust the one set of codes in a CDMA system that does not employ time division.

In accordance with one embodiment of the present invention, FIG. 1 is a high-level diagram depicting communication between a BS 100, over an airlink 200, with a plurality of MSs 300 (only one representative one, designated MS 300-n, is shown). BS 100 has a list 102 of spreading codes used for spreading the signal to each MS 300. Each MS 300 has a copy 302 of its spreading code. The spreading code for each MS 300 is determined according to a combination of a long code employed in the particular BS 100, and pseudo-noise (PN) codes uniquely assigned to each MS 300. The invention may be practiced based on downlink signals (BS 100 to MS 300) or based on uplink (MS 300 to BS 100) signals.

In CDMA transmission, data is typically divided into blocks (e.g., the 20-millisecond frames employed in 2G CDMA). On downlink, data blocks are input to transmitter 104 for transmission to MSs 300. In transmitter 104 the data for a particular MS 300 is prepared for transmission, which includes spreading by the spreading code 102 associated with that particular MS 300. The spread data for all MS 300's is transmitted simultaneously in transmission 202 over a traffic channel of airlink 200, known as the forward link traffic channel or the downlink traffic channel. The data for each particular MS 300 is often referred to as a forward link channel or downlink channel. Thus, common usage contains the redundancy that a plurality of downlink channels exist within the downlink traffic channel. Receiver 304 of each MS 300 receives the downlink traffic channel transmission 202 containing the signal channels for all MSs 300, and correlates in its receiver 304 with the spreading code 302 for the particular MS 300. Receiver 304 is thus able to extract the signal intended for the particular MS 300, while the spread signal for all other MSs 300 is cancelled due to low cross-correlation. Receiver 304 includes a searcher and several correlators arranged in a rake receiver (known in the art and not shown). In the process of correlating the received signal, the receiver 304 components determine transmission delay and signal strength (relative amplitude or power of the main signal and its delayed multipath components, and decodes the data block from the received signal. Then the block is checked for errors. Some error statistic is typically determined for the received signal. One such error statistic is the block error ratio (BLER), which is a long-time average of the ratio of erroneous blocks to all received blocks during that time. Other error statistics, such as frame error ratio (FER), are in use. The BLER (discussed here as an example error statistic) or other such error indicator is periodically reported by each MS 300 to BS 100 in transmission 204. In a preferred embodiment, transmissions 204 through 210 take place over a dedicated control channel (DCCH) and not over a traffic channel.

Although all spreading codes 102 are chosen for orthogonality (i.e., low cross-correlation), signal channels received by an MS 300 in transmission 202 may exhibit a higher degree of cross-correlation because of variations in transmission delay of the signal and because the signal may be received with multipath components having other degrees of delay. In a particular MS 300, the signal spread by another MS 300's codes may have a delayed component which partially correlates with the present MS 300's codes. This has the effect of degrading the signal perceived by the user of the MS 300, and of raising the BLER or other such error indicator in that MS 300.

In BS 100, the BLER's received from all the MS 300's are checked in block 106. If any BLER or other such error indicator exceeds a predetermined limit, BS 100 originates transmission 206, which requests MSs 300 to forward their path information (delay estimates and amplitude or power indications). The path information is forwarded from receivers 304 in transmission 208.

Path information is received from all MSs 300, and in block 110 of BS 100 a new code combination predicted to have lower cross-correlation under current conditions is determined. This determination is contingent on there being available codes not presently in use, i.e., that there presently are fewer MSs 300 in communication with BS 100 than there are available spreading codes. In 3G TDD CDMA, for example, there are 16 codes for each time slot. In 2G CDMA, for example, there are 64 codes.

Due to reciprocity (transmission over a path at some particular frequency has the same characteristics in both directions), the reselection of downlink spreading codes may be performed based on the delays measured in receiver block 114 of BS 100 in systems using the same frequency band for uplink and downlink. In this case transmissions 204 and 206 are not needed. The new code combination is determined in block 110 of BS 100.

A similar reselection of spreading codes may be performed on uplink. Data to be uplinked from a MS 300 is input to transmitter 306, where it is prepared for transmission including being spread by the long code and the MS 300's particular spreading code. It is transmitted in transmission 212 to the BS 100, where in receiver 114 it is despread according to the long code and the MS 300's particular spreading code. Receiver 114, similarly to receiver 304, produces path information (delay estimates and amplitude or power indications) and an error indication such as BLER for each MS 300. The error indications for all the MS 300's are assessed in block 116. If any of the error indications are above a predetermined limit, all path info is provided to block 110 (represented symbolically by AND gate 118).

After new codes are selected in block 110, they are loaded for use by BS 100 and MS 300. In BS 100, the new codes are loaded into spreading codes list 102. Also, the new codes are forwarded in transmissions 210 to each MS 300, where each MS 300 loads its new code as despreading code 302. The next data transmission 202 will be spread and despread according to the new codes. As movement of the mobile terminals or changes in transmission cases cause subsequent degradations of BLER or other such error indicator blow the predetermined threshold, the code recalculation features of the present invention will again be invoked in the same manner as described above.

In a preferred embodiment, the invention is also used to determine optimum codes when a new mobile station is being initiated on a channel or in a time slot of a TDD channel, that is, during handoff or MS switch-on. In FIG. 1, it is indicated in block 108 that a new MS 300 is being initiated. This initiates the same chain of events as block 106's detection of a low BLER or other performance limit. Transmission 206 requests all other MS 300's to forward their path information in transmissions 208. In block 110 optimum codes are determined for the configuration including the newly initiated MS 300. New codes are propagated to lists 102 and 302, and subsequent data transmissions 202 and 212 are spread and despread according to the new codes.

Cross correlation $X_{AB}$ between spreading codes $C_A$ and $C_B$ with d chips delay between the multipaths can be calculated by the following formula:

$$X_{AB}(d) = \sum_{n=1}^{N} c_A(n) c_B(n-d)$$

where N is the length of the spreading code. Selecting the codes can be done by minimizing the values of $X_{AB}$ with the detected delays d. The set of $X_{AB}$ values is calculated by using different possible spreading codes as $C_A$ and $C_B$.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A CDMA system comprising:
    a base station (BS) in two-way radio communication with a plurality of mobile stations (MS's), wherein:
    data passed between the BS and each MS is spread before transmission and despread after reception according to a spreading code unique to the each MS and selected from a set of orthogonal codes;
    each station receives and despreads signal and correlates the signal according to the spreading code unique to the MS identifying a channel from the BS to each MS and a channel from each MS to the BS, determines delays and signal strengths of each multipath component of the channel, and determines an error rate of the channel;
    a detector for detecting whether the error rate for at least one channel has exceeded a predetermined threshold;
    code reselector logic responsive to the detector and arranged to select, according to current delays and signal strengths for the multipath components of the channels, a new association of MS's with spreading codes from the set of orthogonal codes, having lower cross-correlation than currently associated spreading codes; and
    a propagation path for propagating the new code associations to the BS and the plurality of MS's for subsequent use for spreading and despreading signal.

2. The CDMA system according to claim 1, wherein the code reselector logic is further responsive to initiation of an additional MS.

3. The CDMA system according to claim 1, wherein:
    the code reselector logic is colocated with the base station and comprises: p1 means for requesting the MS's to forward current delay and signal strength, and
    means for receiving the current delay and signal strength from the MS's.

4. The CDMA system according to claim 1, wherein:
    transmission from BS to MS's and transmission from MS's to BS take place in a common frequency band;
    the code reselector logic is colocated with the base station;
    the code reselector logic obtains current delay and signal strength for the channels from at least one receiver of the BS.

5. The CDMA system according to claim 1, wherein the code reselector logic is adapted to ignore multipath components of which the signal strength falls below a predetermined threshold.

6. A method for dynamic spreading code reselection in a CDMA system, the system comprising a base station (BS) in two-way radio communication with a plurality of mobile stations (MS's), wherein:
    data passed between the BS and each MS is spread before transmission and despread after reception according to a spreading code unique to the each MS and selected from a set of orthogonal codes;
    each station receives and despreads signal and correlates the signal according to the spreading code unique to the MS identifying a channel from the BS to each MS and a channel from each MS to the BS, determines delays and signal strengths of each multipath component of the channel, and determines an error rate of the channel; and the method comprises the steps of:
    (a) detecting that the error rate for at least one channel has exceeded a predetermined threshold and performing steps (b), (c), and (d) upon the detection;
    (b) selecting, according to current delays and signal strengths for the multipath components of the channels, a new association of MS's with spreading codes from the set of orthogonal codes, having lower cross-correlation than currently associated spreading codes;
    (c) propagating the new code associations to the BS and the plurality of MS's; and
    (d) subsequently using the new code associations for spreading and despreading signal.

7. The method according to claim 6, wherein steps (b), (c), and (d) are performed upon initiation of an additional MS.

8. The method according to claim 6, wherein step (b) further includes:
    requesting the MS's to forward current delay and signal strength, and
    receiving the current delay and signal strength from the MS's.

9. The method according to claim 6, wherein in the CDMA system transmission from BS to MS's and transmission from MS's to BS take place in a common frequency band,
    and wherein step (b) further includes obtaining current delay and signal strength for the channels from at least one receiver of the BS.

10. The CDMA system according to claim 6, wherein in step (b) multipath components of which the signal strength falls below a predetermined threshold are ignored.

* * * * *